(12) United States Patent
Horiuchi et al.

(10) Patent No.: US 8,125,584 B2
(45) Date of Patent: Feb. 28, 2012

(54) LIQUID CRYSTAL DISPLAY PANEL AND LIQUID CRYSTAL DISPLAY DEVICE

(75) Inventors: Satoshi Horiuchi, Taki-gun (JP);
Toshiaki Fujihara, Nabari (JP);
Masakatsu Tominaga, Matsusaka (JP);
Hitoshi Matsumoto, Matsusaka (JP);
Hironobu Sawada, Matsusaka (JP);
Ryohki Itoh, Matsusaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 436 days.

(21) Appl. No.: 12/445,518

(22) PCT Filed: Sep. 4, 2007

(86) PCT No.: PCT/JP2007/067192
§ 371 (c)(1),
(2), (4) Date: Apr. 14, 2009

(87) PCT Pub. No.: WO2008/087764
PCT Pub. Date: Jul. 24, 2008

(65) Prior Publication Data
US 2010/0033643 A1    Feb. 11, 2010

(30) Foreign Application Priority Data
Jan. 17, 2007    (JP) ................. 2007-008125

(51) Int. Cl.
*G02F 1/1343* (2006.01)
*G02F 1/1337* (2006.01)
(52) U.S. Cl. .................................. 349/38; 349/129
(58) Field of Classification Search .......... None
See application file for complete search history.

(56) References Cited

U.S. PATENT DOCUMENTS

| | | | |
|---|---|---|---|
| 6,661,488 B1 | 12/2003 | Takeda | |
| 6,724,452 B1 | 4/2004 | Takeda | |
| 6,836,308 B2 * | 12/2004 | Sawasaki et al. | 349/129 |

(Continued)

FOREIGN PATENT DOCUMENTS

CN    1779536 A    5/2006

(Continued)

OTHER PUBLICATIONS

Chinese Office Action and English translation thereof mailed Sep. 28, 2010 in corresponding Chinese Application 200780042838.5.

(Continued)

*Primary Examiner* — Tina Wong
(74) *Attorney, Agent, or Firm* — Nixon & Vanderhye P.C.

(57) ABSTRACT

The present invention provides a liquid crystal display panel capable of providing a high contrast ratio with a storage capacitance being secured, and also provides a liquid crystal display device including such a panel. The present invention is a liquid crystal display panel having a structure in which a liquid crystal layer is interposed between a first substrate and a second substrate, wherein at least one of the first substrate and the second substrate includes a projection for liquid crystal alignment control, the first substrate includes a scanning signal line, a data signal line, a drain electrode electrically connected to a pixel electrode, a switching element, and a storage capacitor wiring, the storage capacitor wiring includes a main wiring part and a branch part, the branch part being connected to the main wiring part and overlapping with the projection for liquid crystal alignment control.

10 Claims, 5 Drawing Sheets

U.S. PATENT DOCUMENTS

| | | |
|---|---|---|
| 7,136,140 B1 | 11/2006 | Inoue |
| 7,167,224 B1 | 1/2007 | Takeda |
| 7,206,048 B2 * | 4/2007 | Song ............................ 349/129 |
| 7,224,421 B1 | 5/2007 | Takeda |
| 7,304,703 B1 | 12/2007 | Takeda |
| 7,471,348 B2 * | 12/2008 | Misaki et al. .................... 349/39 |
| 2002/0149728 A1 * | 10/2002 | Ogishima et al. ............. 349/129 |
| 2004/0075798 A1 | 4/2004 | Inoue |
| 2004/0119924 A1 | 6/2004 | Takeda |
| 2005/0213007 A1 * | 9/2005 | Wu ................................ 349/129 |
| 2006/0038948 A1 | 2/2006 | Nishikawa et al. |
| 2006/0092366 A1 | 5/2006 | Inoue |
| 2006/0098151 A1 | 5/2006 | Inoue |
| 2006/0227269 A1 * | 10/2006 | Sawasaki et al. ............. 349/129 |
| 2007/0064187 A1 | 3/2007 | Takeda |
| 2007/0126965 A1 * | 6/2007 | Huang et al. .................. 349/129 |
| 2007/0258026 A1 | 11/2007 | Sumi |
| 2008/0111961 A1 * | 5/2008 | Tien et al. ..................... 349/129 |
| 2008/0165314 A1 | 7/2008 | Takeda |
| 2008/0303997 A1 | 12/2008 | Takeda |
| 2009/0225266 A1 * | 9/2009 | Chen ............................. 349/130 |

FOREIGN PATENT DOCUMENTS

| | | |
|---|---|---|
| EP | 0 884 626 | 12/1998 |
| EP | 1 113 312 | 4/2001 |
| EP | 1 103 840 | 5/2001 |
| EP | 1 111 441 | 6/2001 |
| EP | 1 113 311 A2 | 7/2001 |
| EP | 1 411 385 A2 | 4/2004 |
| EP | 1 413 915 | 4/2004 |
| EP | 1 480 070 A2 | 11/2004 |
| EP | 1 621 923 | 2/2006 |
| EP | 1 659 444 A2 | 5/2006 |
| EP | 1 870 767 | 12/2007 |
| EP | 1 930 767 | 6/2008 |
| EP | 1 930 768 | 6/2008 |
| JP | 08-43854 | 2/1996 |
| JP | 11-242225 | 9/1999 |
| JP | 2001-083517 | 3/2001 |
| JP | 2006-154080 | 6/2006 |
| WO | 2006/054386 | 5/2006 |

OTHER PUBLICATIONS

International Search Report for PCT/JP2007/067192, mailed Nov. 27, 2007.

Supplementary European Search Resort mailed Jun. 25, 2010 in corressonding EP application 07828185.4.

* cited by examiner

LIQUID CRYSTAL DISPLAY PANEL AND LIQUID CRYSTAL DISPLAY DEVICE

This application is the U.S. national phase of International Application No. PCT/JP2007/067192, filed 4 Sep. 2007, which designated the U.S. and claims priority to Japanese Patent Application No. 2007-008125, filed 17 Jan. 2007, the entire contents of each of which are hereby incorporated by reference.

TECHNICAL FIELD

The present invention relates to a liquid crystal display panel and a liquid crystal display device. More particularly, the present invention relates to an active matrix liquid crystal display panel including a storage capacitor element, and a liquid crystal display device including such a liquid crystal display panel.

BACKGROUND ART

A liquid crystal display device is a flat panel display that is now most widely used. Particularly, an active matrix liquid crystal display device including a TFT (thin film transistor) is now being used in consumer equipments such as a personal computer, a word processor, and a cellular phone, and its market is expected to be further expanded. With expansion of the market, further improvement in image quality is needed for such a liquid crystal display device.

With regard to the active matrix liquid crystal display device, a technology of forming a storage capacitor element in a pixel region in order to maintain a voltage applied to a liquid crystal layer for a certain period is known. In a field where a higher-definition liquid crystal display device is needed with downsizing of a pixel, a reduction in aperture ratio of a pixel (a proportion of an area of a light transmission part in a pixel), due to a wiring that forms a storage capacitor element (a storage capacitor wiring), needs to be suppressed. However, if the storage capacitor wiring is thinned to reduce the proportion of the area of the storage capacitor wiring in the pixel, a storage capacitance enough for high image qualities cannot be obtained. A technology of increasing the aperture ratio of the pixel with the storage capacitance being secured is now being needed. As such a technology, a technology of forming a storage capacitance using a structure in which an inter layer film, which is an insulating film in a pixel, is interposed between transparent conductive films is known (for example, refer to Patent Document 1).

MVA (multi-domain vertical alignment) mode, which is one kind of VA (vertical alignment) mode, is known as display mode excellent in viewing angle characteristics (for example, refer to Patent Document 2). In VA mode, negative anisotropic liquid crystal molecules are used, and the molecules are aligned vertically to substrate surfaces when no voltage (a voltage of less than a threshold value) is applied, and they are aligned horizontally to the substrate surfaces when a voltage (a voltage of a threshold value or more) is applied. In MVA mode, a structure for controlling alignment of liquid crystal molecules, such as a projective dielectric material (projection for liquid crystal alignment control) and an electrode slit, are formed on substrate surfaces in order to improve a response speed of the liquid crystal molecules at the time of voltage application and to increase a viewing angle.

In the MVA mode liquid crystal display device, as a technology of achieving both securement of a storage capacitance and increase in aperture ratio of a pixel, a technology of forming an auxiliary capacitance to overlap with a slit on a pixel electrode in the normal direction of an active matrix substrate, and a technology of overlapping an extending part of a storage capacitor wiring with a projection for liquid crystal alignment control and/or an electrode-free part are disclosed (for example, refer to Patent Documents 3 and 4). According to these technologies, a storage capacitor element, which is generally made of a shielding material, is arranged in a region where an alignment control structure is arranged, the region having less contribution as a light transmission region, and thereby both of the securement of the storage capacitance and the improvement in aperture ratio of the pixel are achieved.

In the MVA mode liquid crystal display device, it is known that light is leaked from a region where the projection for liquid crystal alignment control is arranged. For this problem, in Patent Document 1, a technology of shielding a part corresponding to the projection for liquid crystal alignment control with BM (black matrix) for improving a contrast ratio has been disclosed.

As mentioned above, the MVA mode liquid crystal display device needs to improve the contrast ratio by preventing light leaked from the region where the projection for liquid crystal alignment control is arranged, in addition to the securement of the storage capacitance and the improvement of the aperture ratio of the pixel. Therefore, the MVA mode liquid crystal display device still has room for improvement in that these problems are comprehensively solved.

[Patent Document 1]
Japanese Kokai Publication No. Hei-08-43854
[Patent Document 2]
Japanese Kokai Publication No. Hei-11-242225
[Patent Document 3]
Japanese Kokai Publication No. 2006-154080
[Patent Document 4]
WO 2006/54386

DISCLOSURE OF INVENTION

The present invention has been made in view of the above-mentioned state of the art. The present invention has an object to provide a liquid crystal display panel that can provide a high contrast ratio with a storage capacitance being secured, and to provide a liquid crystal display device including such a liquid crystal display panel.

The present inventors made various investigations on a MVA mode liquid crystal display panel, particularly on its configuration that can provide a high contrast ratio with a storage capacitance being secured. The inventors noted that in a region where a projection for liquid crystal alignment control is formed, liquid crystal molecules are not aligned vertically to a substrate surface when no voltage is applied, and due to this, the contrast ratio is reduced. Then, the inventors found the following. By additionally arranging apart branched from a main wiring part of a storage capacitor wiring or a drain electrode of a switching element in a region overlapping with a projection for liquid crystal alignment control, a part where liquid crystal molecules are not vertically aligned at the time of no voltage application is shielded while a storage capacitance is secured. In such a manner, the reduction in contrast ratio can be prevented. As a result, the above-mentioned problems have been admirably solved, leading to completion of the present invention.

That is, the present invention is a liquid crystal display panel having a structure in which a liquid crystal layer is interposed between a first substrate and a second substrate, wherein at least one of the first substrate and the second substrate includes a projection for liquid crystal alignment control, the first substrate includes a scanning signal line, a data signal line, a drain electrode electrically connected to a pixel electrode, a switching element, and a storage capacitor wiring, the storage capacitor wiring includes a main wiring part and a branch part, the branch part being connected to the main wiring part and overlapping with the projection for liquid crystal alignment control (herein after, also referred to as the first liquid crystal display panel of the present invention).

The present invention is also a liquid crystal display panel having a structure in which a liquid crystal layer is interposed between a first substrate and a second substrate, at least one of the first substrate and the second substrate includes a projection for liquid crystal alignment control, the first substrate includes a scanning signal line, a data signal line, a drain electrode electrically connected to a pixel electrode, and a switching element, and the first substrate has a structure in which a storage capacitor wiring, a first insulating film, the drain electrode, a second insulating film, and the pixel electrode are stacked in this order, the pixel electrode is connected to the drain electrode through a contact hole formed in the second insulating film, the first substrate includes a transparent conductive film connected to the storage capacitor wiring below the first insulating film, the drain electrode faces the storage capacitor wiring and the transparent conductive film with the first insulating film therebetween and overlaps with the projection for liquid crystal alignment control (herein after, also referred to as the second liquid crystal display panel).

The present invention is mentioned in more detail below.

The liquid crystal display panel of the present invention has a structure in which the liquid crystal layer is interposed between the first substrate and the second substrate. In the liquid crystal display panel, electrodes for applying a voltage to the liquid crystal layer are arranged on both of the first and second substrates, generally. The voltage applied between these electrodes is controlled, and thereby the alignment direction of the liquid crystal molecules in the liquid crystal layer can be changed. In such a way, an amount of light that passes through the liquid crystal layer can be controlled.

Further, at least one of the first and second substrates includes a projection for liquid crystal alignment control. The projection for liquid crystal alignment control is not especially limited as long as its height is smaller than the thickness of the liquid crystal layer. It is preferable that the projection for liquid crystal alignment control is arranged above the pixel electrode in the first substrate and above the common electrode in the second substrate. The planar shape of the projection for liquid crystal alignment control is preferably a rib shape when the substrates are viewed in the normal direction, for example.

The VA mode is preferably applied to the liquid crystal display panel of the present invention because the panel includes a projection for liquid crystal alignment control. In the VA mode, the liquid crystal layer exhibits the following light shutter function: when no voltage is applied, the liquid crystal molecules in the liquid crystal layer are aligned vertically to surfaces of the first and second substrates, and when a voltage of a threshold value or more is applied, the liquid crystal molecules in the liquid crystal layer are aligned horizontally to the surfaces of the first and second substrate. More specifically, the liquid crystal display panel of the present invention is preferably used in an MVA mode liquid crystal display device where liquid crystal molecules are vertically aligned between the substrates when no voltage is applied and a pixel region is divided into a plurality of domains. In this MVA mode, the liquid crystal molecules in the pixel region are aligned to a plurality of different directions by the projection for liquid crystal alignment control, and thereby, the viewing angle can be increased. However, the liquid crystal molecules near the projection for liquid crystal alignment control are tilted to a slope of the projection also during no voltage application, and so such liquid crystal molecules are different in alignment state from those in a region where the projection is not arranged. Accordingly, in the region where the projection for liquid crystal alignment control is arranged, the amount of light that passes through the liquid crystal layer cannot be controlled to a desired one. That's why the contrast ratio is reduced in conventional liquid crystal display devices.

In the MVA mode, as the method of dividing a pixel region into a plurality of domains, a method of providing an electrode slit (opening) for a pixel electrode in the first substrate and/or a common electrode in the second substrate is mentioned, in addition to the method of arranging the projection for liquid crystal alignment control in the substrate. Also in the present invention, in addition to the projection for liquid crystal alignment control, the pixel electrode in the first substrate and/or the common electrode in the second substrate are/is provided with the electrode slit. The substrate(s) in which the projection for liquid crystal alignment control and/or the electrode slit are/is arranged is not especially limited. An embodiment in which the electrode slit is arranged in one substrate and the projection for liquid crystal alignment control is arranged in the other substrate is preferable.

In the first liquid crystal display panel of the present invention, the first substrate includes: a scanning signal line; a data signal line; a drain electrode electrically connected to a pixel electrode; a switching element; and a storage capacitor wiring. The above-mentioned switching element switches an electrical connection between the data signal lines and the drain electrodes. The switching element samples data signals that are simultaneously fed into a plurality of data signal lines based on scanning signals that are sequentially fed into a plurality of scanning signal lines crossing the plurality of data signals, and then, feeds a desired image signal into the pixel electrode. A thin film transistor is preferable as the above-mentioned switching element.

The above-mentioned storage capacitor wiring constitutes a part of a storage capacitor element having a function of suppressing a reduction in voltage of the liquid crystal layer while the switching element is in an OFF state. That is, the function of the storage capacitor element is to help the liquid crystal layer to maintain the data signal that is supplied from the data signal line when the switching element is in an ON state until the next time when the switching element becomes an ON state. The active matrix driving needs this function. The storage capacitor element has a configuration in which at least one of the pixel electrode and the drain electrode is arranged to face the storage capacitor wiring with an insulating film therebetween.

In the first liquid crystal display panel of the present invention, the above-mentioned storage capacitor wiring includes: a main wiring part; and a branch part, and the branch part is connected to the main wiring part and it is arranged to overlap with the projection for liquid crystal alignment control. The main wiring part of the storage capacitor wiring corresponds to a body of the wiring, needed for feeding storage capacitor signals into a plurality of pixels. The branch part of the storage capacitor wiring is a part branched from the main wiring part. The branch part is generally arranged into each pixel. In the present description, the term "overlap" means that a region where one component is arranged overlaps with a region where the other is arranged when the liquid crystal display panel is viewed in the normal direction. The branch part of the storage capacitor wiring may not overlap with the entire projection for liquid crystal alignment control as long as it overlaps with at least part of the projection for liquid crystal alignment control. The entire branch part may not overlap with the project for liquid crystal alignment control. Preferably, the above-mentioned branch part covers the region where the projection for liquid crystal alignment control is arranged. It is preferable that the branch part is arranged along the projection for liquid crystal alignment control to overlap with the projection for liquid crystal alignment control.

According to the first liquid crystal display panel of the present invention, the branch part can shield the region where the projection for liquid crystal alignment control is arranged. So a liquid crystal display device including such a liquid crystal display panel can improve a contrast ratio and provide excellent display qualities. The branch part can be formed simultaneously with the main wiring part by adjusting a patterning shape of the storage capacitor wiring. Therefore, the branch part can be formed in common production procedures, without additional step of the liquid crystal display panel.

According to the first liquid crystal display panel of the present invention, a storage capacitance can be formed at the branch part of the storage capacitor wiring. As a result, an area of the storage capacitor wiring and an area of the electrode facing the storage capacitor wiring, equivalent to a capacitance formed at the branch part, can be reduced. Accordingly, as far as a resistance of the storage capacitor wiring can be suppressed to an acceptable value or less, the storage capacitor wiring can be thinned and the aperture ratio of the pixel (in other words, transmittance) can be improved. As a result, the storage capacitance can be sufficiently secured, and simultaneously, the improvement in aperture ratio of the pixel can be obtained.

The configuration of the first liquid crystal display panel of the present invention is not especially limited. As long as the above-mentioned components are essentially included, the first liquid crystal display panel may or may not include other components. For example, the second substrate is preferably a color filter substrate, and specifically includes a color filter, a light-shielding layer, a common electrode, and the like, preferably. In the VA mode liquid crystal display panel, a vertical alignment film is generally arranged on a surface on the liquid crystal layer side of at least one of the first and second substrates. In addition, the first liquid crystal display panel of the present invention generally includes a pair of polarizers. One of the pair of polarizers is arranged on the outer side (the side opposite to the liquid crystal layer side) of the first substrate. The other is arranged on the outer side (the side opposite to the liquid crystal layer side) of the second substrate. It is preferable that the pair of polarizers is arranged in such a way that their polarization axes are in Cross-Nicol relationship. In such a case, normally black mode display can be provided. In order to obtain a high contrast ratio, it is important to improve the shielding property of the liquid crystal display panel at the time of black state, generally. Accordingly, the normally black mode in which black state is obtained under no voltage application is suitable to VA mode and the like. The projection for liquid crystal alignment control causes alignment variation of the liquid crystal molecules when no voltage is applied. However, according to the first liquid crystal display panel of the present invention, the region where the projection for liquid crystal alignment control is formed is shielded with the branch part of the storage capacitor wiring, and thereby the contrast ratio can be increased.

Preferable embodiments of the first liquid crystal display panel of the present invention are mentioned below.

An embodiment in which the branch parts of the storage capacitor wiring are arranged on both sides of the main wiring part, one on each side, is mentioned as a preferable embodiment of the above-mentioned storage capacitor wiring. Such an embodiment is preferably employed in the case that the projection for liquid crystal alignment control divides the pixel region into domains having equal areas. Particularly, an embodiment in which the branch parts extend from the same position of the main wiring part to both sides, one to each side, is more preferable. The branch parts that are arranged on both sides may have the same length or may have different lengths. An embodiment in which the branch parts are symmetric with respect to the main wiring part is preferable for example, as the embodiment in which the branch parts extend from the same position of the main wiring part to both sides, one to each side, and the branch parts have the same length. According to an embodiment in which the main wiring part of the storage capacitor wiring crosses the center of the pixel region and the branch parts extend to upper and down directions (both directions transverse to the extending direction of the main wiring part), one to each direction, for example, four main domains having equal areas can be formed inside the pixel region in MVA mode. According to the first liquid crystal display panel of the present invention, the storage capacitor wiring can be thinned, and so, the areas of the four main domains can be each secured to be large. As a result, display qualities of the liquid crystal display device can be preferably improved.

Preferable embodiments of the first liquid crystal display panel of the present invention include an embodiment in which the pixel electrode is arranged in V shape, and the projection for liquid crystal alignment control and the branch part of the storage capacitor wiring are arranged in V shape to overlap with the pixel electrode. According to this embodiment, a pixel region in MVA mode can be divided into a plurality of domains having equal areas by the projection for liquid crystal alignment control. This embodiment is preferable for improvement in display qualities of the liquid crystal display device.

Preferable embodiments of the first liquid crystal display panel of the present invention include an embodiment in which the first substrate has a structure in which the storage capacitor wiring, a first insulating film, the drain electrode, a second insulating film, and the pixel electrode are stacked in this order, the pixel electrode is connected to the drain electrode through a contact hole formed in the second insulating film, the drain electrode includes a first capacitance-forming part and a second capacitance-forming part, the first capacitance-forming part facing the main wiring part of the storage capacitor wiring with the first insulating film therebetween, the second capacitance-forming part facing the branch part of the storage capacitor wiring with the first insulating film therebetween. According to this embodiment, the pixel electrode is arranged on the second insulating film, and so, the capacitance between the pixel electrode and the scanning signal line or the data signal line is not increased even if the distance between the pixel electrode and the scanning signal line or the data signal line is decreased in the normal direction of the panel. In addition, according to this embodiment, the short-circuit between the pixel electrode and the scanning signal line or the data signal line is difficult to occur, which enables the area of the pixel electrode to be increased. As a result, the display qualities can be improved, attributed to the increase in aperture ratio. According to this embodiment, the drain electrode is arranged to face the storage capacitor wiring with the first insulating film therebetween, and thereby the storage capacitor element is formed. Further, the second capacitance-forming part, which faces the branch part of the storage capacitor wiring with the first insulating film therebetween, is formed, and so, the branch part of the storage capacitor wiring can be used as a part of the storage capacitor element. As a result, the storage capacitor wiring can be thinned and the aperture ratio can be improved.

Preferable embodiments of the above-mentioned second capacitance-forming part include an embodiment in which an end of the second capacitance-forming part and an end of the branch part of the storage capacitor wiring are positioned at different locations. According to this embodiment, the end of the branch part of the storage capacitor wiring can be positioned in accordance with a location where the projection for liquid crystal alignment control to be shielded is arranged. In the second capacitance-forming part, the location of the end of the branch part can be determined in accordance with the magnitude of the storage capacitance.

According to the first liquid crystal display panel of the present invention, it is preferable that at least one of the branch part of the storage capacitor wiring and the second capacitance-forming part of the drain electrode has a linear shape, the projection for liquid crystal alignment control has a linear shape, the projection for liquid crystal alignment control has a line width smaller than a line width of the branch part of the storage capacitor wiring and/or the second capacitance-forming part of the drain electrode. According to this embodiment, the line width of the projection for liquid crystal alignment control is smaller than the line width of the branch part of the storage capacitor wiring and/or the second capacitance-forming part of the drain electrode. Accordingly, even if the projection for liquid crystal alignment control is misaligned with respect to the branch part of the storage capacitor wiring and/or the second capacitance-forming part of the drain electrode, for example, when the first substrate is attached to the second substrate, a possibility that the projection for liquid crystal alignment control is arranged not to overlap with the branch part of the storage capacitor wiring and/or the second capacitance-forming part of the drain electrode can be reduced. As a result, according to this embodiment, it is possible to prevent a variation in contrast ratio among the pixels or panels, and as a result, the advantage of improving the contrast ratio in the present invention can be more stably exhibited. From the same viewing point, the first liquid crystal display panel of the present invention may have the following embodiment: the branch part of the storage capacitor wiring has a linear shape, the projection for liquid crystal alignment control has a linear shape, the projection for liquid crystal alignment control has a line width smaller than a line width of the branch part of the storage capacitor wiring. It is preferable that each of the branch part of the storage capacitor wiring and the second capacitance-forming part of the drain electrode has a linear shape in view of aperture ratio of the pixel. It is preferable that the branch part of the storage capacitor wiring and the second capacitance-forming part of the drain electrode have different line widths. In such an embodiment, it is possible to prevent a variation in an area of the overlapping between the branch part of the storage capacitor wiring and the second capacitance-forming part of the drain electrode, even if the branch part of the storage capacitor wiring is misaligned with respect to the second capacitance-forming part of the drain electrode. As a result, the value of the storage capacitance can be stabilized. The linear shape is not especially limited as long as it is a thin and long shape like a line. It may be a straight line shape and a curved line shape. It is preferable that the linear shape is a straight line shape in order to easily divide the pixel region into domains having equal areas. With regard to the shape of the branch part of the storage capacitor wiring, the straight line may have a bend part, or the straight line may have a plurality of branched parts.

In the present invention, instead of the branch part of the storage capacitor wiring, the drain electrode may be used for shielding the region where the projection for liquid crystal alignment control is arranged. That is, the present invention is a liquid crystal display panel having a structure in which a liquid crystal layer is interposed between a first substrate and a second substrate, at least one of the first substrate and the second substrate includes a projection for liquid crystal alignment control, the first substrate includes a scanning signal line, a data signal line, a drain electrode electrically connected to a pixel electrode, and a switching element, and the first substrate has a structure in which a storage capacitor wiring, a first insulating film, the drain electrode, a second insulating film, and the pixel electrode are stacked in this order, the pixel electrode is connected to the drain electrode through a contact hole formed in the second insulating film, the first substrate includes a transparent conductive film connected to the storage capacitor wiring below the first insulating film, the drain electrode faces the storage capacitor wiring and the transparent conductive film with the first insulating film therebetween and overlaps with the projection for liquid crystal alignment control (the second liquid crystal display panel of the present invention).

In the second liquid crystal display panel of the present invention, a part that overlaps with the projection for liquid crystal alignment control of the drain electrode is used for light-shielding, and the part and the transparent conductive film, which faces the part with the first insulating film therebetween, form a storage capacitance. As a result, the storage capacitor wiring can be thinned, leading to improvement in aperture ratio of the pixel. According to the second liquid crystal display panel of the present invention, the alignment of the liquid crystal molecules near the electrode slit can be stabilized by a voltage applied to the transparent conductive film when the pixel electrode is provided with the electrode slit. In addition, according to the second liquid crystal display panel of the present invention, the pixel electrode is arranged on the second insulating film, and so the capacitance between the pixel electrode and the scanning signal line or the data signal line is not increased even if the distance between the pixel electrode and the scanning signal line or the data signal line is decreased in the normal direction of the panel. Further, a short-circuit between the pixel electrode and the scanning signal line or the data signal line is difficult to occur, and so the area of the pixel electrode can be increased. As a result, an improvement in display qualities, attributed to an increase in aperture ratio, is permitted.

The configuration of the second liquid crystal display panel of the present invention is not especially limited. The second liquid crystal display panel of the present invention may or may not include other components as long as it essentially includes the above-mentioned components. Preferable embodiments of the second liquid crystal display panel of the present invention are mentioned below but the contents that have been mentioned in the first liquid crystal display panel of the present invention are omitted.

Preferable embodiments of the above-mentioned drain electrode include an embodiment in which parts that each overlap with the projection for liquid crystal alignment control of the drain electrode extend toward both sides, one toward each side, of a part that faces the storage capacitor wiring with the first insulating film therebetween of the drain electrode. Particularly, it is more preferable that the parts that each overlap with the projection for liquid crystal alignment control of the drain electrode extend from the same position of the part that faces the storage capacitor wiring with the first insulating film therebetween toward both sides, one toward each side. It is still more preferable that the parts that each overlap with the projection for liquid crystal alignment control of the drain electrode are symmetric with respect to the part that faces the storage capacitor wiring with the first insulating film therebetween of the drain electrode. In addition, each of the above-mentioned projection for liquid crystal alignment control and the above-mentioned part that overlaps with the projection for liquid crystal alignment control of the drain region has a substantially linear shape, and a line width of the projection for liquid crystal alignment control is smaller than a line width of the part that overlaps with the projection for liquid crystal alignment control of the drain electrode. Further, the second liquid crystal display panel of the present invention generally includes a pair of polarizers, one of the pair of polarizers being arranged on the outer side (the side opposite to the liquid crystal layer side) of the first substrate, the other being arranged on the outer side (the side opposite to the liquid crystal layer side) of the second substrate. In such a case, it is preferable that the pair of polarizers is arranged in such a way that polarization axes of the polarizers are in a Cross-Nicol relationship.

The present invention can be applied to a Cs-on-Gate system where a storage capacitor element is formed using the scanning signal line instead of the storage capacitor wiring. That is, the present invention also may be a liquid crystal display panel having a structure in which a liquid crystal layer is interposed between a first substrate and a second substrate, wherein at least one of the first substrate and the second substrate includes a projection for liquid crystal alignment control, the first substrate includes a scanning signal line, a data signal line, a drain electrode electrically connected to a pixel electrode, and a switching element, the scanning signal line includes a main wiring part and a branch part, the branch part being connected to the main wiring part and overlapping with the projection for liquid crystal alignment control. Further, the present invention may be a liquid crystal display panel having a structure in which a liquid crystal layer is interposed between a first substrate and a second substrate, at least one of the first substrate and the second substrate includes a projection for liquid crystal alignment control, the first substrate includes a scanning signal line, a data signal line, a drain electrode electrically connected to a pixel electrode, and a switching element, and the first substrate has a structure in which a scanning signal line, a first insulating film, the drain electrode, a second insulating film, and the pixel electrode are stacked in this order, the pixel electrode is connected to the drain electrode through a contact hole formed in the second insulating film, the drain electrode faces the scanning signal line and the transparent conductive film with the first insulating film therebetween and overlaps with the projection for liquid crystal alignment control.

The above-mentioned scanning signal line faces the pixel electrode or the drain electrode with the insulating film therebetween. In such a Cs-on-gate system as well as a Cs-on-Common system where a storage capacitor wiring is used, the operation and advantages of the present invention can be obtained.

Various embodiments in the first and second liquid crystal display panel of the present invention, mentioned above, may be appropriately employed in combination.

The present invention is also a liquid crystal display device including the liquid crystal display panel. The liquid crystal display device of the present invention includes the first or second liquid crystal display panel of the present invention as a component. Accordingly, the storage capacitance can be secured, and simultaneously, the high contrast ratio can be provided. As a result, liquid crystal display with excellent display qualities can be provided. The liquid crystal display device of the present invention displays images in the following manner, generally. An electric field formed by applying a voltage between the pixel electrode and the common electrode controls the alignment of the liquid crystal molecules, and by this alignment control, a transmission amount of light from a backlight and the like is adjusted.

The configuration of the liquid crystal display device of the present invention has the above-mentioned characteristics. The liquid crystal display device may or may not include other components as long as it includes components a liquid crystal display device generally includes. In the present invention, it is preferable that every pixel is the pixel that includes the branch part of the storage capacitor wiring and/or the drain electrode, each overlapping with the projection for liquid crystal alignment control, but it is sufficient that most of the pixels are such pixels.

EFFECT OF THE INVENTION

The liquid crystal display panel of the present invention can provide a high contrast ratio with a storage capacitance being secured because of the above-mentioned configuration. Further, an area of a storage capacitor wiring and an area of an electrode facing the storage capacitor wiring, equivalent to a storage capacitance formed at the branch part of the storage capacitor wiring and/or the drain electrode, each overlapping with the projection for liquid crystal alignment control, can be reduced. Accordingly, the storage capacitor wiring can be thinned as far as a resistance of the storage capacitor wiring can be suppressed to an acceptable value or less.

BEST MODES FOR CARRYING OUT THE INVENTION

The present invention is mentioned in more detail below with reference to Embodiments, using drawings. However, the present invention is not limited to only these Embodiments.

Embodiment 1

FIG. 1 is a planar view schematically showing a configuration of one pixel in a liquid crystal display panel in accordance with Embodiment 1. The liquid crystal display panel in the present Embodiment has a structure in which a liquid crystal layer is interposed between an active matrix substrate and a color filter substrate. FIG. 1 mainly shows a pixel configuration of the active matrix substrate, and omits components of the color filter substrate, other than a projection for alignment control 10. FIG. 2 is a cross-sectional view schematically showing the liquid crystal display panel taken along line A-B in FIG. 1.

In the present Embodiment, the active matrix substrate has the following configuration. On a transparent insulating substrate 30, a scanning signal line 3 and a storage capacitor wiring 51; a gate insulating film 4, which is the first insulating film; a drain electrode 52; an inter layer insulating film 5, which is the second insulating film; and a pixel electrode 6, are stacked toward a liquid crystal layer 8 in this order. If the substrate is viewed in the normal direction, a plurality of the pixel electrodes 6 having a rectangular shape are arrayed in a matrix pattern. Scanning signal lines 3 and data signal lines 12 are arranged to be perpendicular to each other and they surround the pixel electrode 6. At a corner of the pixel, which is an intersection of the scanning signal line 3 and the data signal line 12, a thin film transistor (TFT) 14 is arranged.

The TFT 14 is a switching element connected to the scanning signal line 3, the data signal line 12, and the drain electrode 52 and has the following configuration. A semiconductor layer is arranged above a gate electrode with the gate insulating film 4 therebetween, the gate electrode being the scanning signal line 3 that extends to the TFT 14; a source electrode, which is the data signal line 12 that extends to the TFT 14, is arranged at one end of the semiconductor layer; the drain electrode 52 is arranged at the other end of the semiconductor layer; the source electrode and the drain electrode 52 are arranged to face each other with a distance therebetween. In the TFT 14 having such a configuration, a scanning signal, which is fed into the gate electrode through the scanning signal line 3, adjusts an amount of electric current that flows in the semiconductor layer, and thereby a data signal that is fed into the source electrode through the data signal line 12 is controlled when being fed into the drain electrode 52.

The storage capacitor wiring 51 functions as a lower electrode (electrode on the transparent insulating substrate 30 side) of the storage capacitor element. Further, the storage capacitor wiring 51 is composed of a main wiring part 51a and two branch parts 51b and 51c. The main wiring part 51a crosses the center of a pixel region in the direction perpendicular to the data signal lines 12, i.e., the direction parallel to the scanning signal lines 3. The two branch parts 51b, 51c extend toward both sides of the main wiring part 51a (both directions transverse to the extending direction of the main wiring part 51a) to be symmetric with respect to the main wiring part 51a. With regard to the entire shape of the storage capacitor wiring 51, the branch parts 51b, 51c form a substantially V shape, and the main wiring part 51a penetrates through a bend part of the V shape (bottom of the V shape). The branch parts 51b, 51c extend from the main wiring part 51a to overlap with the projection for liquid crystal alignment control 10, which is arranged in the color filter substrate, when the active matrix substrate and the color filter substrate that have been attached to each other are viewed in the normal direction. Attributed to these branch parts 51b, 51c, a region where the projection for liquid crystal alignment control 10 is arranged can be shielded and a storage capacitance can be increased. The width of the branch parts 51b, 51c is larger than that of the projection for liquid crystal alignment control 10 in order to prevent light from the region corresponding to the projection for liquid crystal alignment control 10 from being insufficiently shielded due to misalignment of the substrates at the time of attachment.

The drain electrode 52 overlaps with the storage capacitor wiring 51 with the gate insulating film 4 therebetween and it functions as an upper electrode (electrode on the liquid crystal layer 8 side) of the storage capacitor element. Accordingly, the drain electrode 52 has substantially the same shape as that of the storage capacitor wiring 51 as viewed in the normal direction of the substrates, except that the drain electrode 52 extends to the TFT 14, which is positioned at the corner of the pixel, and that the drain electrode 52 has a line width smaller than that of the storage capacitor wiring 51. That is, the drain electrode 52 is composed of a main electrode part 52a and two branch parts 52b, 52c. The main electrode part 52a faces the main wiring part 51a of the storage capacitor wiring 51. The gate insulating film 4 is arranged between the main electrode part 52a and the main wiring part 51a. The two branch parts 52b, 52c face the branch parts 51b, 51c of the storage capacitor wiring. The gate insulating film 4 is arranged between the branch parts 52b, 52c, and the branch parts 51b, 51c. The main electrode part 52a of the drain electrode 52 is connected to the pixel electrode 6 through a contact hole 13. The branch part 52b extends to a corner of the pixel and it is connected to the TFT 14.

According to the present embodiment, it is preferable that either one of the branch parts 51b, 51c of the storage capacitor wiring 51 and the branch parts 52b, 52c of the drain electrode 52 has a line width larger than a line width of the other in order to suppress a variation in an area of a region where the both are overlapped with each other due to misalignment. In FIG. 1, the branch parts 51b, 51c of the storage capacitor wiring 51 have a line width larger than that of the branch parts 52b, 52c of the drain electrode 52.

It is preferable that metals (wiring and electrode) that are formed in the same layer level have a certain distance therebetween so as not to short-circuit with each other. The distance is preferably determined in accordance with a patterning accuracy of the metals. The metals, which are formed in the same layer level, include a combination of the storage capacitor wiring 51 and the scanning signal line 3, and a combination of the drain electrode 52 and the data signal line 12, for example. That is, it is preferable that the branch parts 51b, 51c of the storage capacitor wiring 51 and the scanning signal line 3 are formed to have a certain distance therebetween. It is preferable that the branch parts 52b, 52c of the drain electrode 52 and the data signal line 12 are formed to have a certain distance therebetween.

In order not to form an unnecessary capacitance, it is preferable that metals that are formed in different layer levels also have a certain distance therebetween. The distance is also determined in accordance with a patterning accuracy of the metals.

A vertical alignment film (not shown) is arranged on a surface on the liquid crystal layer 8 side of the active matrix substrate. The pixel electrode 6 is provided with a slit for alignment control 6a (electrode-free part) in the direction parallel to the projection for liquid crystal alignment control 10, which is arranged in the color filter substrate. The electrode slit 6a and the projection for liquid crystal alignment control 10 are alternately arranged with a certain distance therebetween as viewed in the normal direction of the substrates.

The color filter substrate has a configuration in which a color filter 11, a black matrix (not shown), the projection for alignment control 10, a common electrode 9 are stacked toward the liquid crystal layer 8 on the transparent insulating substrate 30. The color filter 11 is arranged in a matrix pattern to face the pixel electrode 6. A black matrix is arranged in a space between the color filters 11. The projection for alignment control 10 is formed to have a substantially linear shape. Some of the projections for alignment control 10 are arranged into a V shape to further divide the half of the pixel, which has been divided in the middle of the pixel by the main wiring 51a of the storage capacitor wiring 51, in half diagonally. The common electrode 9 is arranged over the entire substrate surface. A vertical alignment film (not shown) is arranged on a surface on the liquid crystal layer 8 side of the color filter substrate.

A production method of the liquid crystal display panel in accordance with the present Embodiment is mentioned below.

"Production Method of Active Matrix Substrate"

The scanning signal line 3 and the storage capacitor wiring 51 are formed on the transparent insulating substrate 30, which is made of glass, plastic, and the like. Each of the scanning signal line 3 and the storage capacitor wiring 51 is a film of metal such as titanium, chromium, aluminum, and molybdenum, a film of an alloy thereof, or a multi-layer film of these films, each formed by sputtering. Successively, the film is patterned by photolithography and the like. As a result, the scanning signal line 3 and the storage capacitor wiring 51 are formed. It is preferable that the width of the main wiring part 51a of the storage capacitor wiring 51 is within an acceptable range where display qualities are not deteriorated by signal delay attributed to a resistance of the wiring. It is preferable that the branch parts 51b, 51c are arranged to overlap with the projection for liquid crystal alignment control 10, which is arranged in the color filter substrate, and to have a width larger than a width of the projection for liquid crystal alignment control 10.

Then, the gate insulating film 4 is formed over the entire substrate surface to cover the scanning signal line 3 and the storage capacitor wiring 51. The gate insulating film 4 is an insulating film such as a silicon nitride film, a silicon oxide film, and a metal oxide film. A high-resistant semiconductor layer made of amorphous silicon, polysilicon, and the like, is formed on the gate insulating film 4 to overlap with the gate electrode of the TFT 14. Thereon, a low-resistant semiconductor layer made of, for example, n+ amorphous silicon, which is amorphous silicon doped with impurities such as phosphorus, is formed as an ohmic contact layer. The gate insulating film 4, the high-resistant semiconductor layer, and the low-resistant semiconductor layer are formed by forming a film by PECVD (plasma enhanced chemical vapor deposition) and the like and patterning the film by photolithography and the like.

The data signal line 12 and the drain electrode 52 are formed to be connected to the low-resistant semiconductor layer. The data signal line 12 and the drain electrode 52 are formed by forming a film of metal such as titanium, chromium, aluminum, molybdenum, tantalum, tungsten, and copper, a film of an alloy thereof, or a multi-layer film of these films by sputtering and the like, and patterning the film into a desired shape by photolithography.

The above-mentioned high-resistant semiconductor layer and low-resistant semiconductor layer are subjected to channel etching by dry-etching using the patterns of the source electrode and the drain electrode 52 as a mask. As a result, the TFT 14 is completed.

Then, the inter layer insulating film 5 is formed over the entire substrate surface to cover upper faces (exposed faces) each of the TFT 14, the data signal line 12, and the drain electrode 52. A resin film such as a photosensitive resin film, an inorganic insulating film such as a silicon nitride film and a silicon oxide film, a multi-layer film of these films, and the like, are used as the inter layer insulating film 5. For example, a silicon nitride film is formed by PECVD method, and thereon, a photosensitive acrylic resin film is formed by die coating.

Successively, the contact hole 13, which penetrates the inter layer insulating film 5, is formed at a position overlapping with the main wiring part 51a of the storage capacitor wiring 51. For example, a photosensitive acrylic resin film that is the inter layer insulating film 5 is patterned by photolithography, and then, using the patterned photosensitive acrylic resin film as a mask, a silicon nitride film is dry-etched, and as a result, an opening for the contact hole 13 is formed.

Then, a conductive film is formed on the inter layer insulating film 5 and in the opening for the contact hole 13. For example, the conductive film is a transparent conductive film of indium tin oxide (ITO), indium zinc oxide (IZO), zinc oxide (ZnO), tin oxide (SnO), and the like, a film of an alloy thereof, or a multi-layer film of these films, each formed by sputtering. As a result, the contact hole 13 is completed. The conductive film on the inter layer insulating film 5 is patterned into a desired shape by photolithography, and as a result, the pixel electrode 6 is formed. At the time of the patterning, an electrode slit 6a for alignment control is also formed together with the pixel electrode 6. Then, a vertical alignment film is formed over the entire substrate surface. As a result, the active matrix substrate is completed.

"Production Method of Color Filter Substrate"

First, a black matrix (not shown) and the color filter 11 are formed on a transparent insulating substrate 30, which is made of glass, plastic, and the like. Then, the projection for liquid crystal alignment control 10 is formed on the transparent insulating substrate 30, on which the black matrix and the color filter 11 has been formed. A phenol novolac photosensitive resin liquid is applied by spin coating and then dried and solidified. Then, the formed film is patterned into a substantially linear shape by photolithography.

Then, the common electrode 9 is formed in the substrate, on which the projection for liquid crystal alignment control 10 has been arranged. The common electrode 9 is a transparent conductive film of indium tin oxide (ITO), indium zinc oxide (IZO), zinc oxide (ZnO), tin oxide (SnO), and the like, a film of an alloy thereof, or a multi-layer film of these films, each formed on the entire substrate surface by sputtering. Then, a vertical alignment film is formed on the common electrode 9. As a result, the color filter substrate is completed.

"Assembly of Liquid Crystal Display Panel"

Then, a spacer is sprayed on at least one of the active matrix substrate and the color filter substrate. A column spacer made of resin may be previously formed on the active matrix substrate and/or the color filter substrate, instead that the spacer is sprayed. Then, the active matrix substrate is attached to the color filter substrate with a sealing member. After the attachment, the following embodiment is achieved: the branch parts 51b, 51c of the storage capacitor wiring 51 and the branch parts 52b, 52c of the drain electrode 52, each formed in the active matrix substrate, overlap with the projection for liquid crystal alignment control 10, formed in the color filter substrate. A liquid crystal material is injected between the active matrix substrate and the color filter substrate. If the liquid crystal material is injected by dropwise addition, it is performed before the attachment. If the liquid crystal material is injected in vacuum, it is performed after the attachment. Then, a polarizer, a phase difference film, and the like, are attached to the substrates after the liquid crystal material is injected. As a result, a liquid crystal display panel is completed. A gate driver, a source driver, a display control circuit, and the like, are mounted on the liquid crystal display panel, and further, a backlight and the like, is combined with the panel. As a result, a liquid crystal display device is completed.

According to the liquid crystal display device including the liquid crystal display panel in accordance with the present Embodiment, the branch parts 51b, 51c of the storage capacitor wiring 51, and branch parts 52b, 52c of the drain electrode 52 are arranged to overlap with the projection for liquid crystal alignment control 10 in the color filter substrate. Hence, a sufficient storage capacitance is secured without an increase in the number of production steps and light leakage caused by variation in liquid crystal alignment due to the projection for liquid crystal alignment control 10 can be suppressed, and a high contrast ratio can be provided.

In addition, a storage capacitance (the first capacitance) that is formed between the main wiring part 51a of the storage capacitor wiring 51 and the main electrode 52a of the drain electrode 52 with the gate insulating film 4 therebetween can be decreased in accordance with a magnitude of a storage capacitance (the second capacitance) that is formed by the branch parts 51b, 51c of the storage capacitor wiring 51 and the branch parts 52b, 52c of the drain electrode 52 with the gate insulating film 4 therebetween. That is, the width of the main wiring part 51a of the storage capacitor wiring 51 can be decreased in accordance with a magnitude of the second capacitance. As a result, four domains each having a large transmission region can be formed. As shown in FIG. 1, the projection for liquid crystal alignment control 10, which is formed into a substantially V shape in the pixel region, divides the pixel region into four domains having equal areas of the transmission region, and further, corresponding to the projection for liquid crystal alignment control 10, which is formed into a substantially V shape, the branch parts 51b, 51c of the storage capacitor wiring 51 extend toward both sides of the main wiring part 51a, which crosses the center of the pixel region. As a result, display qualities of the liquid crystal display device can be more effectively improved.

FIG. 1 shows an embodiment in which the branch parts 51b, 51c of the storage capacitor wiring 51 overlap with the projection for liquid crystal alignment control 10 to shield light leaked at the region corresponding to the projection for liquid crystal alignment control 10. The branch parts 51b, 51c overlap with the electrode slit 6a for liquid crystal alignment control and also shield light leaked at the region corresponding to the electrode slit 6a, similarly to the projection for liquid crystal alignment control 10. Further, in FIG. 1, the branch part 51b of the storage capacitor wiring on the TFT 14 side (on the lower side of a storage capacitor wiring 17 in FIG. 1) and the branch part 51c of the storage capacitor wiring on the opposite side (on the upper side of the storage capacitor wiring 17) have the same (equivalent) length but may have different lengths.

Embodiment 2

FIG. 3 is a planar view schematically showing a configuration of one pixel of a liquid crystal display panel in Embodiment 2. As shown in FIG. 3, in the liquid crystal display panel in accordance with the present Embodiment, a drain electrode 53 is arranged to overlap with the main wiring part 51a and the branch part 51b, which is positioned on the TFT 14 side, of the storage capacitor wiring 51. That is, the drain electrode 53 is composed of a main electrode part 53a and one branch part 53b. The main electrode part 53a faces the main wiring part 51a of the storage capacitor wiring 51 with the gate insulating film 4 therebetween. The branch part 53b faces the branch part 51b of the storage capacitor wiring 51 with the gate insulating film 4 therebetween. Accordingly, the liquid crystal display panel in the present Embodiment has the same configuration as in Embodiment 1, except that the drain electrode 53 is not formed at a position overlapping with the branch part 51c, which is positioned on the side opposite to the TFT 14 side. The liquid crystal display panel in the present Embodiment can be preferably used if a sufficient storage capacitance is secured by the main wiring 51a and the branch part 51b.

Embodiment 3

FIG. 4 is a planar view schematically showing a configuration of one pixel of a liquid crystal display panel in accordance with Embodiment 3. As shown in FIG. 4, in the liquid crystal display panel in accordance with the present Embodiment, a drain electrode 54 is arranged to overlap with the main wiring part 51a of the storage capacitor wiring 51, substantially the entire branch part 51b on the TFT 14 side, and substantially half of the branch part 51c on the side opposite to the TFT 14 side. That is, the drain electrode 54 is composed of a main electrode 54a and two branch parts 54b, 54c. The main electrode part 54a faces the main wiring part 51a of the storage capacitor wiring 51 with the gate insulating film 4 therebetween. The two branch parts 54b, 54c face the branch parts 51b, 51c of the storage capacitor wiring 51 with the gate insulating film 4 therebetween. The liquid crystal display panel in the present Embodiment has the same configuration as in Embodiment 1, except that the branch part 54c of the drain electrode 54 and the branch part 51c of the storage capacitor wiring 51 have different lengths, and that instead that the branch part 54c is arranged to overlap with substantially the entire branch part 51c, the branch part 54c is arranged to overlap with half of the branch part 51c. As in the liquid crystal display panel in the present Embodiment, the end position of the branch part 51c is different form the end position of the branch part 54c facing the branch part 51c. Thus, the magnitude of the storage capacitance can be easily adjusted.

Embodiment 4

FIG. 5 is a planar view schematically showing a configuration of one pixel of the liquid crystal display panel in accordance with Embodiment 4. The liquid crystal display panel in the present Embodiment has a structure in which the liquid crystal layer is interposed between the active matrix substrate and the color filter substrate. FIG. 5 mainly shows a pixel configuration of the active matrix substrate, and omits components of the color filter substrate, other than the projection for alignment control 10. FIG. 6 is across-sectional view schematically showing the liquid crystal display panel taken along line C-D in FIG. 5.

The liquid crystal display panel in accordance with the present Embodiment has the same configuration as in Embodiment 1, except that a transparent conductive film 15 is formed instead that the storage capacitor wiring 61 has no branch part. As shown in FIG. 5, the transparent conductive film 15 is arranged to be slightly smaller than the pixel electrode 6 in the region surrounded by the scanning signal lines 3 and the data signal lines 12 perpendicular to each other as viewed in the normal direction of the substrate. As shown in FIG. 6, the transparent conductive film 15 is arranged above the transparent insulating substrate 30 and below the storage capacitor wiring 61 as viewed in the cross-sectional direction. That is, the transparent conductive film 15 is arranged between the transparent insulating substrate 30 and the storage capacitor wiring 61. The same material as that for the pixel electrode 6 can be used as a material for the transparent conductive film 15.

According to the present Embodiment, a drain electrode 62 is arranged to overlap with the projection for liquid crystal alignment control 10 in the color filter substrate. Hence, light leakage caused by variation in liquid crystal alignment due to the projection for liquid crystal alignment control 10 can be suppressed and a high contrast ratio can be provided. Accordingly, it is preferable that the drain electrode 62 (the main electrode part 62a and the branch parts 62b, 62c) is formed of a light-shielding conductive film, as mentioned above.

According to the present Embodiment, in addition to the storage capacitance formed between the main electrode part 62a of the drain electrode 62 and the storage capacitor wiring 61, a storage capacitance is also formed between the branch parts 62b, 62c of the drain electrode 62 and the transparent conductive film 15, and between the transparent conductive film 15 and the pixel electrode 6. Hence, a much more storage capacitance can be secured. Accordingly, the width of the storage capacitor wiring 61 can be decreased in accordance with a magnitude of the storage capacitance formed between the branch parts 62b, 62c of the drain electrode 62 and the transparent conductive film 15 and the storage capacitance formed between the transparent conductive film 15 and the pixel electrode 6. As a result, four domains each having a large transmission region can be formed. As shown in FIG. 5, the projection for liquid crystal alignment control 10, which is formed into a substantially V shape in the pixel region, divides the pixel into four domains having equal transmissive regions. The branch parts 62b, 62c of the drain electrode 62, corresponding to the projection for liquid crystal alignment control 10 formed into a substantially V shape, extend toward both sides of the storage capacitor wiring 61, which crosses the center of the pixel region. As a result, the display qualities of the liquid crystal display device can be more effectively improved.

FIG. 5 shows an embodiment in which the drain electrode 62 overlaps with the projection for liquid crystal alignment control 10 to shield light leaked at the region corresponding to the projection for liquid crystal alignment control 10. The drain electrode 62 may overlap with the electrode slit 6a for liquid crystal alignment control and also shield light leaked at the region corresponding to the electrode slit 6a, similarly to the projection for liquid crystal alignment control 10. In FIG. 6, the transparent conductive film 15 is arranged below the storage capacitor wiring 61, but may have a configuration in which the transparent conductive film 15 is arranged above the storage capacitor wiring 61. That is, the storage capacitor wiring 61 and the transparent conductive film 15 may be stacked in this order on the transparent insulating substrate 30 side.

According to the present Embodiment, the storage capacitor wiring 61 has no branch part. However, the branch part of the storage capacitor wiring may be formed at a position overlapping with the projection for liquid crystal alignment control 10 and the branch parts 62b, 62c of the drain electrode 62.

Embodiment 5

FIG. 7 is a planar view schematically showing a configuration of one pixel of a liquid crystal display panel in accordance with Embodiment 5. As shown in FIG. 7, in the liquid crystal display panel in accordance with the present Embodiment, a storage capacitor wiring 71 is composed of a main wiring part 71a and four branch parts 71b, 71c, 71d, and 71e. The main wiring part 71a passes the center of the pixel region. The branch parts 71b, 71c extend toward one side of the main wiring part 71a and the branch parts 71d, 71e extend toward the other side thereof. The branch parts 71b, 71c and the branch parts 71d, 71e are symmetric with respect to the main wiring part 71a. A drain electrode 72 is composed of a main electrode part 72a and branch parts 72b, 72c, 72d, 72e. The main electrode part 72a faces the main wiring part 71a of the storage capacitance wiring 71 with a gate insulating film therebetween. The four branch parts 72b, 72c, 72d, 72e of the drain electrode 72 face the branch parts 71b, 71c, 71d, 71e of the storage capacitor wiring 71 with the gate insulating film therebetween. Thus, in the present invention, the numbers of the branch part of the storage capacitor wiring and the branch part of the drain electrode are not especially limited.

Embodiment 6

FIG. 8 is a planar view schematically showing a configuration of one pixel in a liquid crystal display panel in accordance with Embodiment 6. As shown in FIG. 8, in the liquid crystal display panel in according to the present Embodiment, the pixel electrode 7 is arranged into a V shape, and an electrode slit 7a, a projection for liquid crystal alignment control 10a and the branch parts 71b, 71c, 71d, 71e of the storage capacitor wiring 71 are arranged into a V shape to overlap with the pixel electrode 7. The storage capacitor wiring 71 is composed of the main wiring part 71a and the four branch parts 71b, 71c, 71d, and 71e. The main wiring part 71a crosses the center of the pixel region. The branch parts 71b, 71c extend toward one side of the main wiring part 71a and the branch parts 71d, 71e extend toward the other side thereof. The branch parts 71b, 71c and the branch parts 71d, 71e are symmetric with respect to the main wiring part 71a. The drain electrode 72 is composed of the main electrode part 72a and the branch parts 72b, 72c, 72d, 72e. The main electrode part 72a faces the main wiring part 71a of the storage capacitor wiring 71 with the gate insulating film therebetween. The branch parts 72b, 72c, 72d, 72e face the four branch parts 71b, 71c, 71d, 71e of the storage capacitor wiring 71 respectively with the gate insulating film therebetween. According to the liquid crystal display panel in the present Embodiment, the bend parts (bottom parts) of the V shape in the pixel electrode 7, the electrode slit 7a, the projection for liquid crystal alignment control 10a, the branch parts 71b, 71c, 71d, 71e of the storage capacitor wiring 71, and the branch parts 72b, 72c, 72d, 72e of the drain electrode 72 are all positioned above the main wiring part 71a of the storage capacitor wiring 71. According to this embodiment, the projection for liquid crystal alignment control 10a divides the pixel region in MVA mode into a plurality of domains having equal areas, and as a result, display qualities of the liquid crystal display device can be preferably improved.

The present application claims priority to Patent Application No. 2007-8125 filed in Japan on Jan. 17, 2007 under the Paris Convention and provisions of national law in a designated State, the entire contents of which are hereby incorporated by reference.

The terms "or more" and "or less" in the present description mean that the value described (boundary value) is included.

EXPLANATION OF NUMERALS AND SYMBOLS

Figure 1:
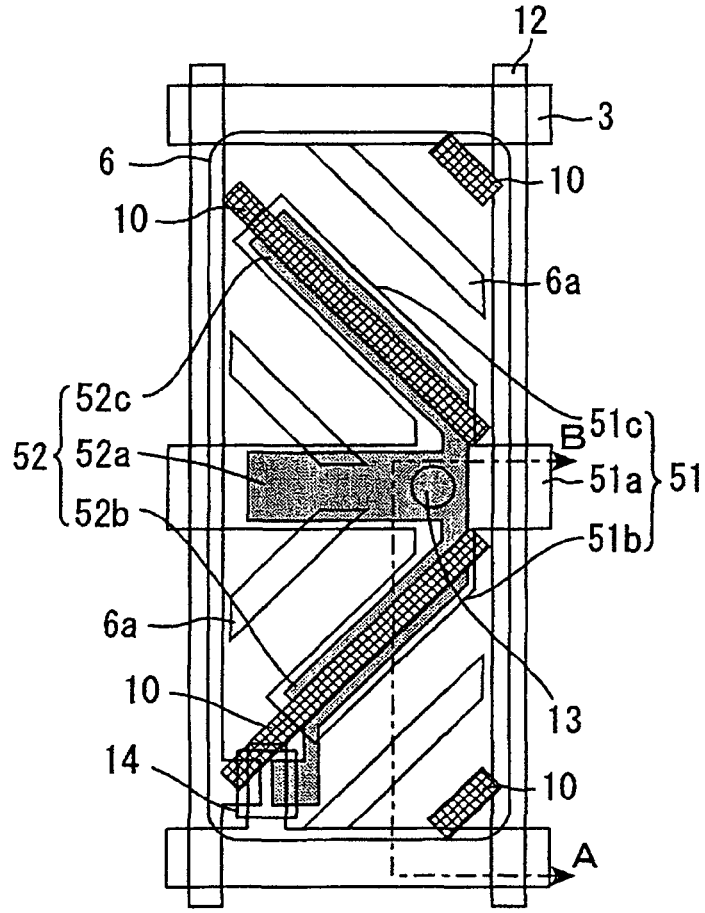
FIG. 1 is a planar view schematically showing a configuration of one pixel of the liquid crystal display panel in accordance with Embodiment 1.
Figure 2:
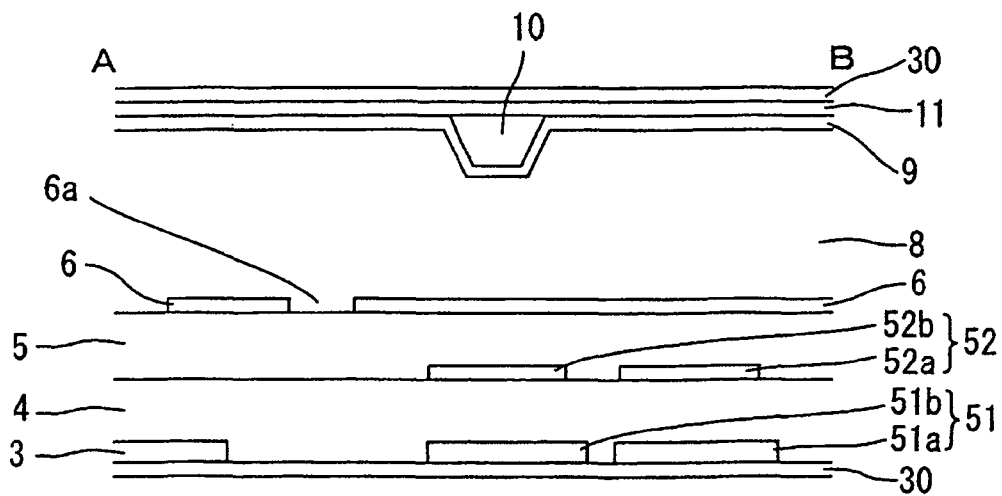
FIG. 2 is a cross-sectional view schematically showing the liquid crystal panel taken along line A-B in FIG. 1.
Figure 3:
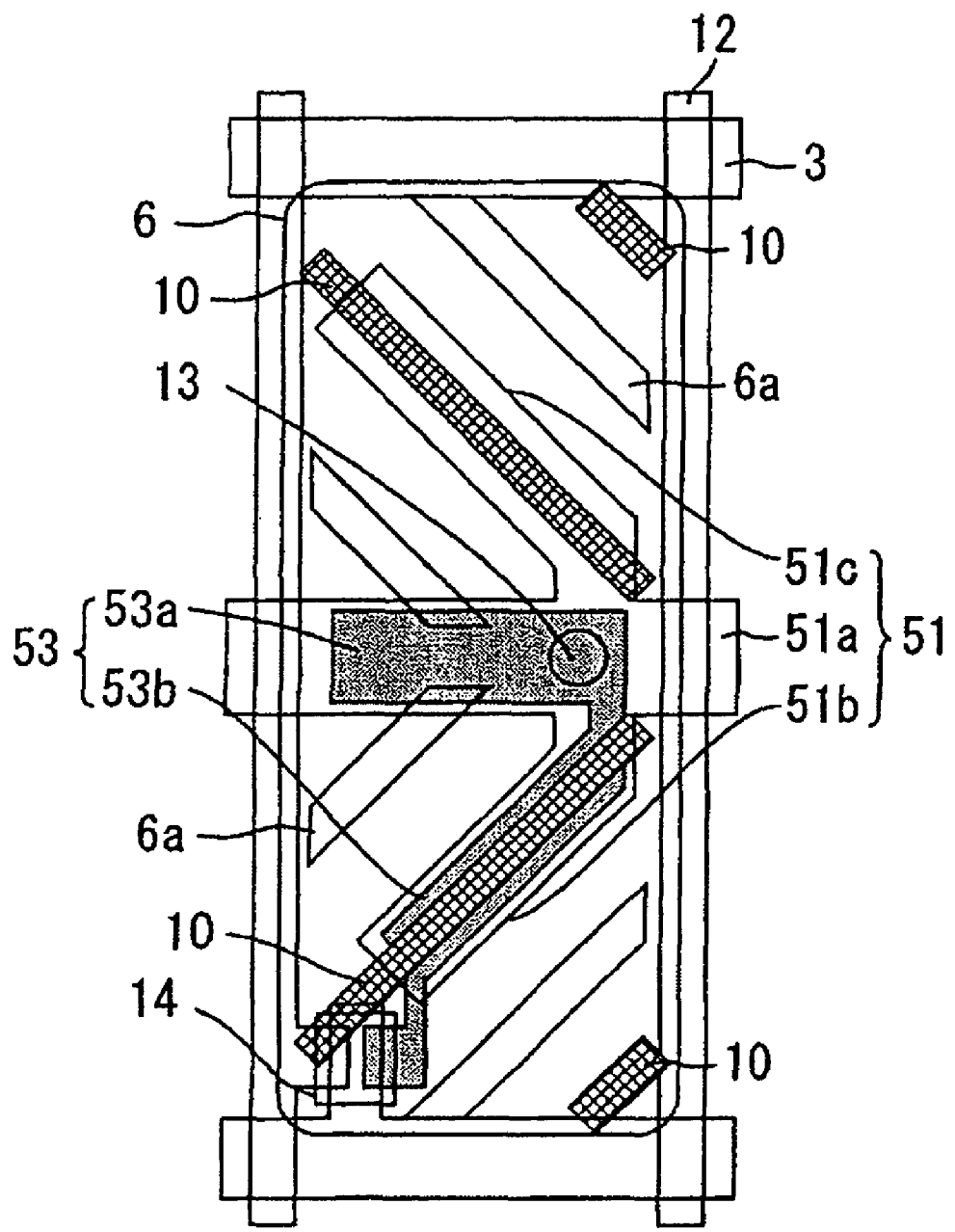
FIG. 3 is a planar view schematically showing a configuration of one pixel of the liquid crystal display panel in accordance with Embodiment 2.
Figure 4:
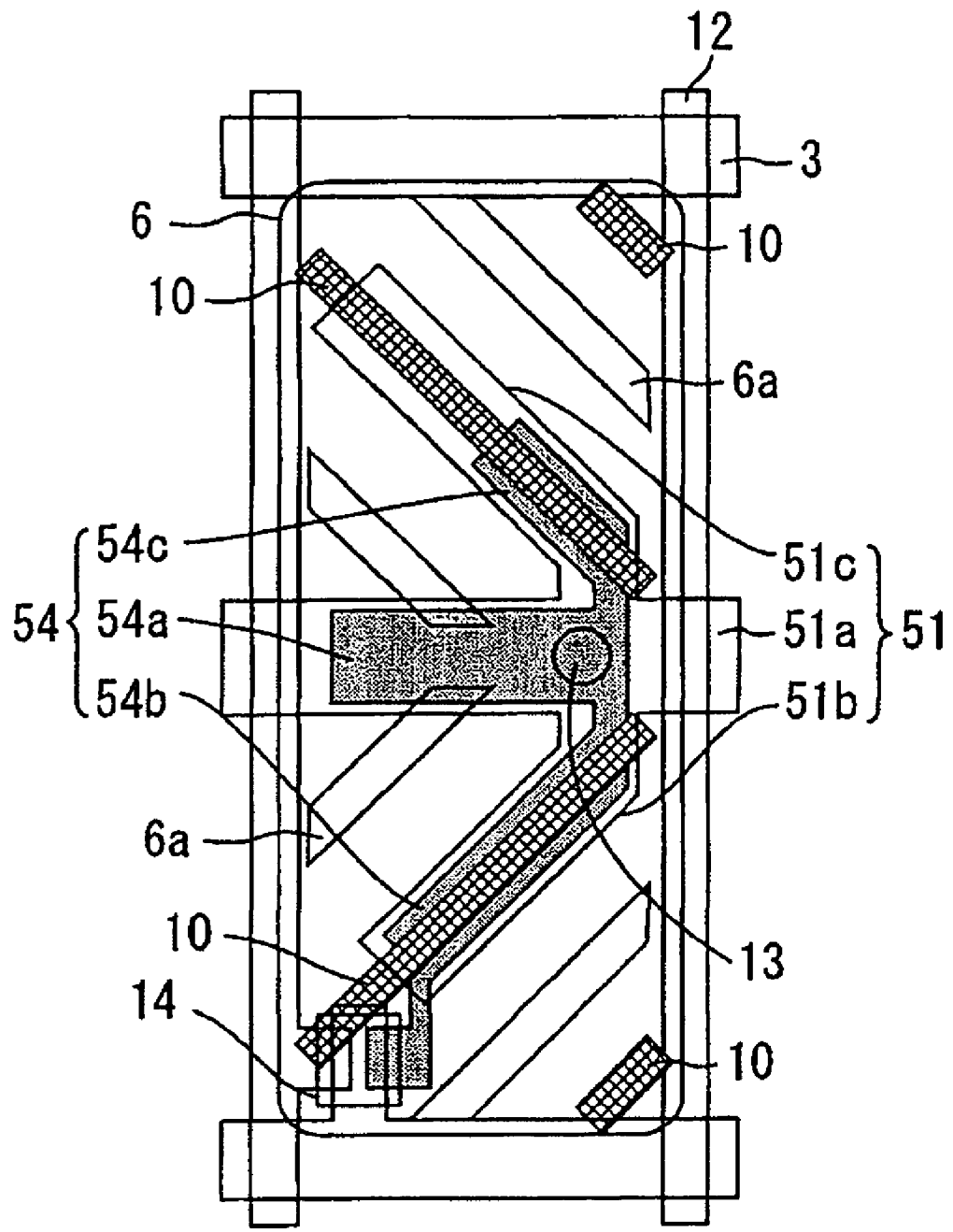
FIG. 4 is a planar view schematically showing a configuration of one pixel of the liquid crystal display panel in accordance with Embodiment 3.
Figure 5:
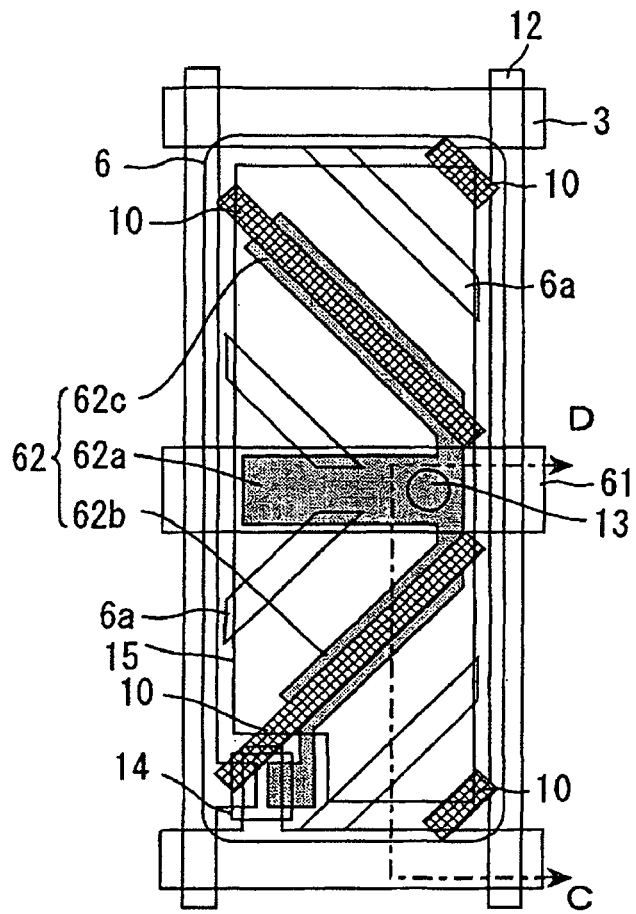
FIG. 5 is a planar view schematically showing a configuration of one pixel of the liquid crystal display panel in accordance with Embodiment 4.
Figure 6:
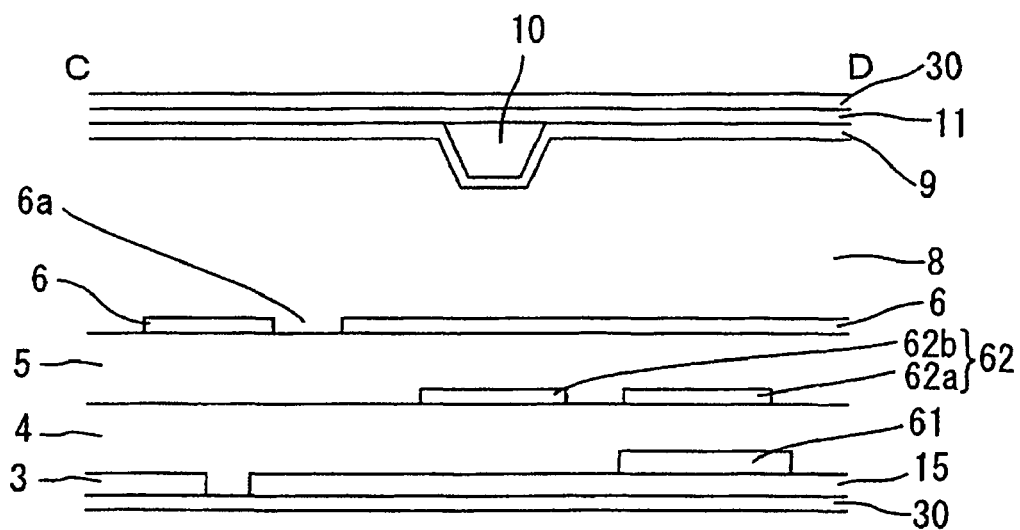
FIG. 6 is a cross-sectional view schematically showing the liquid crystal display panel taken along line C-D in FIG. 5.
Figure 7:
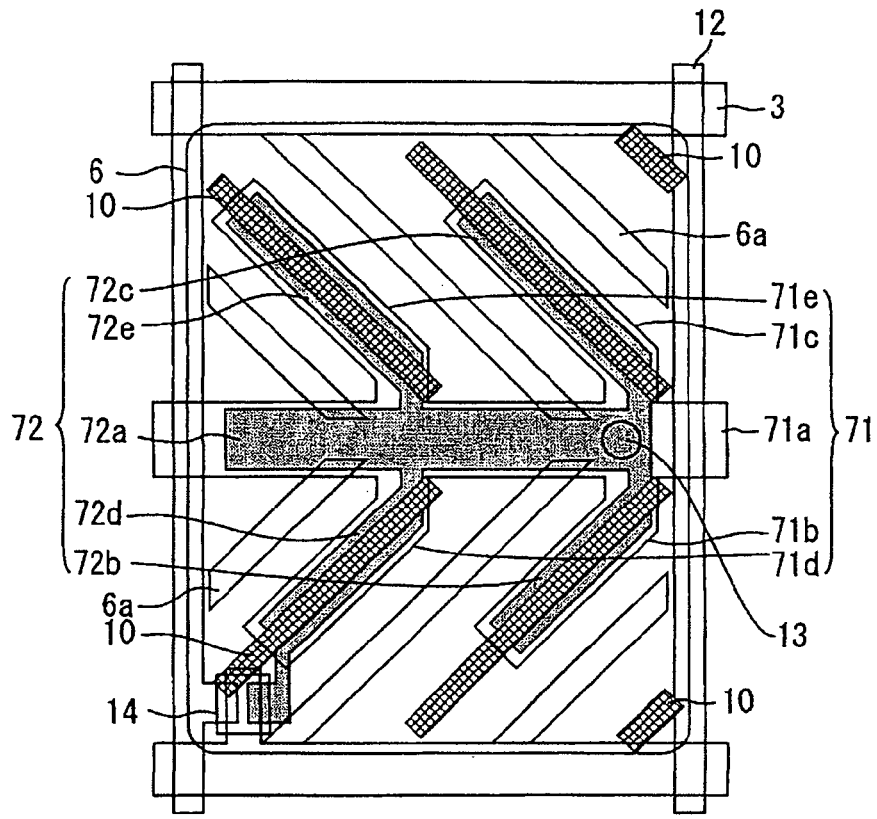
FIG. 7 is a planar view schematically showing a configuration of one pixel of the liquid crystal display panel in accordance with Embodiment 5.
Figure 8:
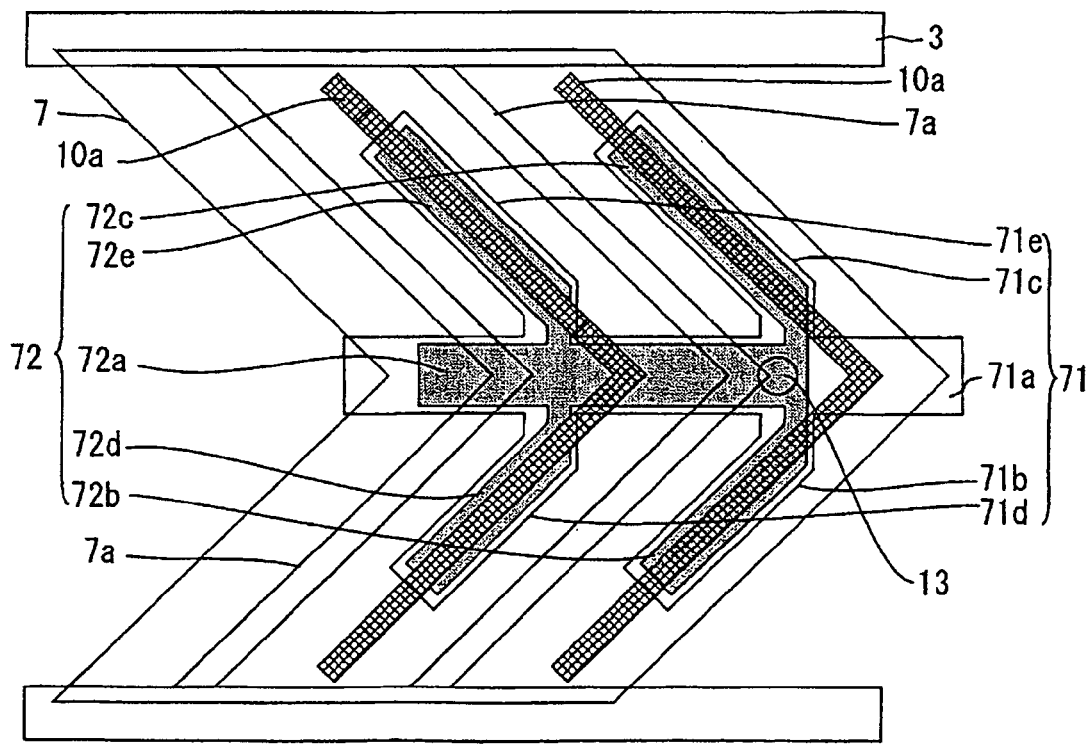
FIG. 8 is a planar view schematically showing a configuration of one pixel of the liquid crystal display panel in accordance with Embodiment 6.

3: Scanning signal line
4: Gate insulating film
5: Inter layer insulating film
6, 7: Pixel electrode
6a, 7a: Electrode slit
8: Liquid crystal layer
9: Common electrode
10, 10a: Projection for liquid crystal alignment control
11: Color filter
12: Data signal line
13: Contact hole
14: Thin film transistor
15: Transparent conductive film
30: Transparent insulating substrate
51, 61, 71: Storage capacitor wiring
51a, 71a: Main wiring part of storage capacitor wiring
51b, 51c, 71b, 71c, 71d, 71e: Branch part of storage capacitor wiring
52, 53, 54, 62, 72: Drain electrode
52a, 53a, 54a, 62a, 72a: Main electrode part of drain electrode
52b, 52c, 53b, 53c, 54b, 54c, 62b, 62c, 72b, 72c, 72d, 72e: Branch part of drain electrode

The invention claimed is:

1. A liquid crystal display panel comprising:
a liquid crystal layer is interposed between a first substrate and a second substrate,
wherein at least one of the first substrate and the second substrate includes a projection for liquid crystal alignment control,
the first substrate includes a scanning signal line, a data signal line, a drain electrode electrically connected to a pixel electrode, a switching element, and a storage capacitor wiring,
the storage capacitor wiring includes a main wiring part and a branch part, the branch part being connected to the main wiring part and overlapping with the projection for liquid crystal alignment control,
the drain electrode includes a first capacitance-forming part and a second capacitance-forming part,
the first capacitance-forming part facing the main wiring part of the storage capacitor wiring with at least a first insulating film therebetween, and
the second capacitance-forming part facing the branch part of the storage capacitor wiring with at least the first insulating film therebetween.

2. The liquid crystal display panel according to claim 1, wherein the branch parts of the storage capacitor wiring are arranged on both sides of the main wiring part, one on each side.

3. The liquid crystal display panel according to claim 2, wherein the branch parts of the storage capacitor wiring are symmetric with respect to the main wiring part.

4. The liquid crystal display panel according to claim 1, wherein the pixel electrode is arranged in V shape, and the projection for liquid crystal alignment control and the branch part of the storage capacitor wiring are arranged in V shape to overlap with the pixel electrode.

5. The liquid crystal display panel according to claim 1,
wherein the first substrate has a structure in which the storage capacitor wiring, a first insulating film, the drain electrode, a second insulating film, and the pixel electrode are stacked in this order,
the pixel electrode is connected to the drain electrode through a contact hole formed in the second insulating film.

6. The liquid crystal display panel according to claim 5,
wherein an end of the second capacitance-forming part and an end of the branch part of the storage capacitor wiring are positioned at different locations.

7. The liquid crystal display panel according to claim 5,
wherein at least one of the branch part of the storage capacitor wiring and the second capacitance-forming part of the drain electrode has a linear shape,
the projection for liquid crystal alignment control has a linear shape,
the projection for liquid crystal alignment control has a line width smaller than a line width of the branch part of the storage capacitor wiring and/or the second capacitance-forming part of the drain electrode.

8. The liquid crystal display panel according to claim 1,
wherein the branch part of the storage capacitor wiring has a linear shape,
the projection for liquid crystal alignment control has a linear shape,
the projection for liquid crystal alignment control has a line width smaller than a line width of the branch part of the storage capacitor wiring.

9. A liquid crystal display panel comprising:
a liquid crystal layer is interposed between a first substrate and a second substrate, at least one of the first substrate and the second substrate includes a projection for liquid crystal alignment control, the first substrate includes a scanning signal line, a data signal line, a drain electrode electrically connected to a pixel electrode, and a switching element, and
the first substrate comprises a structure in which a storage capacitor wiring, a first insulating film, the drain electrode, a second insulating film, and the pixel electrode are stacked in this order,
the pixel electrode is connected to the drain electrode through a contact hole formed in the second insulating film,
the first substrate includes a transparent conductive film connected to the storage capacitor wiring below the first insulating film,
the drain electrode faces the storage capacitor wiring and the transparent conductive film with the first insulating film therebetween and overlaps with the projection for liquid crystal alignment control.

10. A liquid crystal display device comprising the liquid crystal display panel according to claim 1.

* * * * *